June 28, 1927.

C. C. FARMER

COMPRESSOR CONTROLLING DEVICE

Filed Aug. 27, 1926

1,633,778

INVENTOR

CLYDE C. FARMER

BY *Wm. M. Cady*

ATTORNEY

Patented June 28, 1927.

1,633,778

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMPRESSOR-CONTROLLING DEVICE.

Application filed August 27, 1926. Serial No. 131,924.

This invention relates to fluid compressors, and more particularly to the control of a fluid compressor when applied to an automotive vehicle.

Fluid compressors are frequently applied to automotive vehicles for the purpose of supplying compressed air for operating brakes or for other purposes. In some cases, it is considered desirable to operate the compressor from the transmission gears of the vehicle, but when the compressor is so operated, shifting of the gears is made difficult, due to the retarding effect of the compressor on the gears.

The principal object of my invention is to provide means for reducing the retarding effect of the compressor when the gears are shifted.

Figure 1:
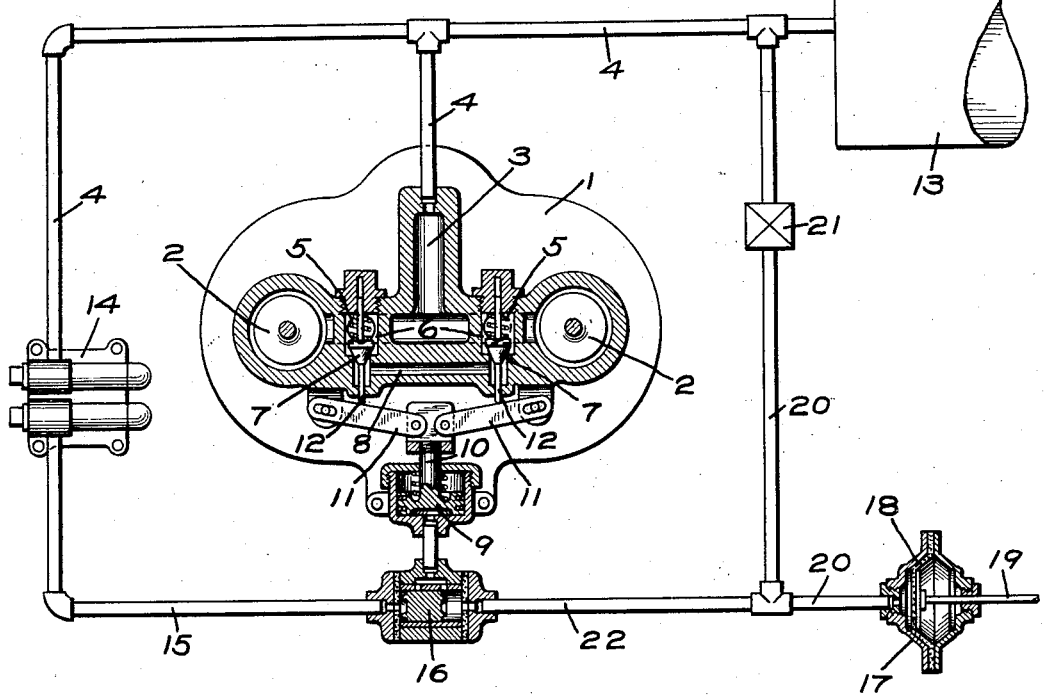
Figure 2:
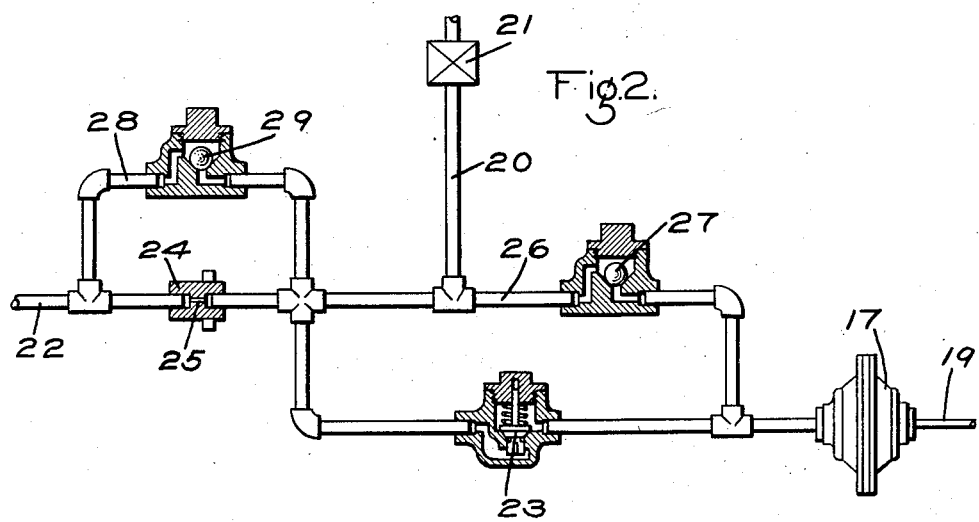

In the accompanying drawing, Fig. 1 is a diagrammatic view of an equipment including a fluid compressor and means in accordance with my invention for reducing the retarding effect of the compressor when the gears are shifted; and Fig. 2 a diagrammatic view of a modification, which may be employed in connection with the apparatus shown in Fig. 1.

In Fig. 1, the reference numeral 1 indicates a fluid compressor of the type having two compressing cylinders, each cylinder having an outlet valve 2, past which fluid compressed in the cylinders, is supplied to passage 3 and thence through pipe 4 to a storage reservoir 13.

A passage 5 leads to each cylinder and opens to a valve chamber 6, each containing a valve 7. When said valves are opened, the two passages 5 and consequently the two compressing cylinders are connected to a common passage 8, so that when the compressor is running, with the valves 7 open, the fluid in the cylinders merely passes back and forth from one cylinder to the other and the compressor therefore operates without compressing fluid.

For operating the valves 7, a piston 9 is provided, having a stem 10 connected to lever arms 11, each adapted to engage one of the stems 12 of the valves 7.

A pressure governor 14, of any desired type is provided, which is controlled by the pressure of fluid in the reservoir 13 and is adapted, when the pressure in the reservoir 13 has been increased to a predetermined degree by operation of the compressor 1, to supply fluid under pressure to a pipe 15 and thence past a double check valve 16, to piston 9.

A diaphragm chamber 17 is provided, containing a flexible diaphragm 18, which is connected to a rod 19, the rod 19 being operatively connected to the vehicle clutch operating mechanism, so that when the fluid under pressure is supplied to the diaphragm 18, the rod 19 is operated to actuate the mechanism for throwing out the vehicle clutch.

A pedal operated valve device is provided for controlling the supply of fluid under pressure through pipe 20 to the diaphragm 18, said valve device being indicated diagrammatically by the reference numeral 21.

The pipe 20 is connected, through pipe 22, with one side of the double check valve 16, the other side of said double check valve being connected to pipe 15.

In operation, when the gears are to be shifted, the clutch is first thrown out, by operating the valve device 21, so as to admit fluid under pressure to pipe 20 and the diaphragm 18, the rod 19 being then actuated to effect the throwing out of the clutch.

Fluid under pressure supplied to pipe 20 is also supplied to pipe 22, and consequently, the double check valve 16 is shifted, so that fluid from pipe 22 is admitted to the piston 9. Said piston is then operated to shift the lever arms 11 and thereby effect the opening of the valves 7. The opening of the valves 7 relieves the compressor of its load and, consequently, when the gears are shifted, the compressor, which is operated through a connection to the gears, will not have a tendency to slow down the gears, so as to render the shifting of the gears difficult.

In some instances, motor vehicles are already equipped with a fluid compressor, a compressor governor, and an unloading means controlled by the governor for unloading the compressor, when the pressure of fluid in the storage reservoir has been increased to a predetermined degree and when so equipped, it is merely necessary to add the double check valve 16 and the means for controlling the clutch by fluid under pressure in order to accomplish the desired result.

It may be desirable to ensure that the unloading of the compressor will occur prior to the disengagement of the clutch and that the engagement of the clutch will occur prior to the loading of the compressor and for this purpose, as shown in Fig. 2, a weighted valve 23 may be interposed in the pipe connection leading from the pipe 20 to the diaphragm chamber 17, so that when the pedal 21 is operated, fluid under pressure will at once flow past the double check valve 16 to effect the unloading of the compressor, but before fluid can flow to the clutch operating diaphragm chamber 17, the pressure must be increased to a degree sufficient to overcome the loading of the valve 23. When the pressure has been so increased, the valve 23 will open, to permit flow of fluid to the diaphragm chamber 17. By this means, the disengagement of the clutch is delayed until the unloading of the compressor is positively ensured.

In order to ensure that the clutch will be engaged before the compressor is again loaded, a choke fitting 24 having a restricted port 25 is interposed between the double check valve 16 and the pedal valve device 21, so that when the pedal valve device 21 is operated to release fluid under pressure, the release from the unloading piston 9 is delayed by reason of the restricted flow through the port 25. At the same time, the release of fluid from the clutch operated chamber 17 is quickly effected by way of a by-pass pipe 26, which contains a check valve 27, so as to prevent flow through the by-pass pipe 26 from the pedal valve device 21 to the chamber 17.

A by-pass pipe 28 is also provided around the choke fitting 24, so that flow from the pedal valve device 21 to the double check valve 16 will not be impeded, the by-pass pipe 28 containing a check valve 29, to prevent the release of fluid from the piston 9, except by way of the restricted port 25.

Having now described my invention, what I claim as new and desire to secure by Letters Patent, is:—

1. The combination with a motor vehicle clutch controlling device and a fluid compressor, of means for unloading the compressor upon operating said controlling device to disengage the clutch.

2. The combination with a motor vehicle clutch controlling device operable by fluid under pressure, a fluid compressor, and fluid pressure operated means for unloading the compressor, of means under the control of an operator for supplying fluid under pressure to said unloading means when fluid under pressure is supplied to said motor vehicle clutch controlling device.

3. In a motor vehicle controlling apparatus, the combination with a device operated by fluid under pressure for disengaging the motor vehicle clutch, a fluid compressor, and means operated by fluid under pressure for unloading the compressor, of a valve device controlled by the operator for supplying fluid under pressure to said device and said unloading means.

4. The combination with a motor vehicle clutch controlling device, a fluid compressor, and means for unloading the compressor, of means for first operating said device to disengage the clutch and then said unloading means to unload the compressor.

5. The combination with a motor vehicle clutch controlling device, a fluid compressor, and means for unloading the compressor, of means for first operating said device to engage the clutch and then said unloading means to load the compressor.

6. The combination with a motor vehicle clutch controlling device, a fluid compressor, and means for unloading the compressor, of means for operating said unloading means to unload the compressor after said device is operated to disengage the clutch and for operating said unloading means to prevent the loading of the compressor after said device is operated to engage the clutch.

7. The combination with a motor vehicle clutch controlling device operated by fluid under pressure for disengaging the clutch, a fluid compressor, and means operated by fluid under pressure for unloading the compressor, of a governor device operated upon a predetermined increase in the pressure of fluid compressed by the compressor for supplying fluid under pressure to said unloading means, and manually operable means for supplying fluid under pressure to said clutch controlling device and also to said unloading means.

8. The combination with a motor vehicle clutch controlling device operated by fluid under pressure for disengaging the clutch, a fluid compressor, and means operated by fluid under pressure for unloading the compressor, of a governor device operated upon a predetermined increase in the pressure of fluid compressed by the compressor for supplying fluid under pressure to said unloading means, manually operable means for supplying fluid under pressure to said clutch controlling means and also to said unloading means, and a double check valve for controlling communication from said governor and from said manually operable means to said unloading means.

In testimony whereof I have hereunto set my hand.

CLYDE C. FARMER.